United States Patent [19]
Nakata et al.

[11] Patent Number: 5,845,155
[45] Date of Patent: Dec. 1, 1998

[54] MULTIPOINT AUTOFOCUSING SYSTEM

[75] Inventors: Masahiro Nakata; Shigeru Iwamoto, both of Tokyo, Japan

[73] Assignee: Asahi Kogaku Kogyo Kabushiki Kaisha, Tokyo, Japan

[21] Appl. No.: 921,020

[22] Filed: Aug. 29, 1997

[30] Foreign Application Priority Data

Aug. 29, 1996 [JP] Japan .................................. 8-227968

[51] Int. Cl.⁶ .................................................. G03B 13/32
[52] U.S. Cl. ............................................ 396/96; 396/121
[58] Field of Search .............................. 396/96, 121, 122, 396/123

[56] References Cited

U.S. PATENT DOCUMENTS

| | | | |
|---|---|---|---|
| 5,151,732 | 9/1992 | Akashi et al. | 396/96 |
| 5,153,630 | 10/1992 | Ogasawara | 396/96 |
| 5,218,395 | 6/1993 | Taniguchi et al. | 396/96 |
| 5,664,237 | 9/1997 | Watanabe | 396/96 |
| 5,666,567 | 9/1997 | Kusaka | 396/96 |
| 5,701,524 | 12/1997 | Kusaka et al. | 396/123 |
| 5,721,977 | 2/1998 | Yamawaki et al. | 396/96 |
| 5,731,864 | 3/1998 | Hamada et al. | 396/96 |

*Primary Examiner*—Russell E. Adams
*Attorney, Agent, or Firm*—Greenblum & Bernstein, P.L.C.

[57] ABSTRACT

A multipoint autofocusing system has a plurality of light receiving devices each having a plurality of focus detection areas which receive light of object images and perform an integral operation in which the object light is converted to produce integrated electric charges. A detecting device is provided for detecting an integration time of each of the light receiving devices based upon commencement of the integral operation. An integration control device is provided for controlling the integration times to stop the integral operation of one of the light receiving devices when the integration time of the light receiving device reaches a predetermined integral value. The integration time of the light receiving device that first reaches the predetermined integral value is t1, and the integration time of the remaining light receiving devices that have not reached the predetermined integral value is t. The integration control device controls termination of the integral operation of the remaining light receiving devices in accordance with a ratio of t/t1.

11 Claims, 7 Drawing Sheets

MULTIPOINT AUTOFOCUSING SYSTEM

BACKGROUND OF THE INVENTION

1. Field of the Invention

The present invention relates to a multipoint autofocusing system for an optical instrument such as a camera, in which a focus state of object images within a plurality of focus detection zones can be detected.

2. Description of the Related Art

In a multipoint autofocusing system which can detect the focus states of objects within a plurality of focus detection zones (detection areas), the object image is received by a line sensor (light receiving device) for each focus detection zone and is converted into an electrical signal. Thereafter, the electric charges are integrated. When the integral value of each line sensor reaches a predetermined value, the integral operation of the line sensor is completed. The integral operation continues until the integral value becomes a predetermined value or a predetermined maximum integration time lapses, whichever is sooner. For a line sensor in which the integral value does not become a predetermined value after the lapse of the maximum integration time, the integral operation is forcedly stopped. Upon completion of the integral operation of all the line sensors, the integral value is read from each line sensor to detect the focus state to thereby calculate the amount of defocus, for example. Therefore, even if the integral operation of a line sensor is completed, no operation subsequent to the integral operation can be carried out for that line sensor before the integral operation of all of the line sensors is completed.

In the case that there is a large difference in the contrast or brightness between the objects, the integral operation of a line sensor which receives a high brightness object image is complete within a short space of time. However, there is a possibility that the integral operation of a line sensor which receives a low brightness object image is not completed within the maximum integration time. In this case, subsequent operations cannot be commenced before the integral operations of all the line sensors are completed, in spite of the completion of the integral operation necessary to detect the focus for the high brightness object, since the integral operation for the low brightness object is not completed. Consequently, the focusing operation requires a long time.

SUMMARY OF THE INVENTION

It is an object of the present invention to provide a multipoint autofocusing system in which the time necessary for the autofocusing operation can be reduced.

To achieve the object mentioned above, according to an aspect of the present invention, there is provided a multipoint autofocusing system having a plurality of light receiving devices, a detecting device, and an integration control device. Each light receiving device has a plurality of focus detection areas which receive light of object images and performs an integral operation in which the object light is converted to produce integrated electrical charges. The detecting device detects an integration time of each of the light receiving device reckoned from a commencement of the integral operation. The integration control device is for controlling the integral values to stop the integral operation of one of the light receiving devices when the integral value of the one of the light receiving devices reaches a predetermined integral value. The integration time of the light receiving device that first reaches the predetermined integral value is t1, and the integration time of the remaining light receiving devices that have not reached the predetermined integral value is t. The integration control device controls the termination of the integral operation of the remaining light receiving devices in accordance with a ratio of t/t1.

According to another aspect of the present invention, there is provided a multipoint autofocusing system including a plurality of light receiving devices, a first monitor device, a detecting device and an integration control device. Each light receiving device has a plurality of focus detection areas which receive light of object images and perform an integral operation in which the object light is converted to produce integrated electric charges. The first monitor device is for monitoring integral values of each of the light receiving devices. The detecting device is for detecting an integration time of each of the light receiving devices reckoned from a commencement of the integral operation. The integration control device is for controlling the integral values to stop the integral operation of one of the light receiving devices when the integral value of the one of the light receiving devices reaches a predetermined integral value. The integration control device is also for forcedly for forcedly terminating the integral operation of all of the light receiving devices whose integral values have not reached the predetermined integral value after a maximum integration time $t_{max}$ has lapsed. The integration control device determines a forced integral stop time using a formula defined by:

t1×(predetermined integral value).

t1 represents a shortest integration time of the light receiving device which first reaches the predetermined integral value. The integration control device forcedly terminates the integral operation of all the light receiving devices whose integral values have not reached the predetermined integral value after the lapse of the maximum integration time $t_{max}$.

The present disclosure relates to subject matter contained in Japanese Patent Application No.8-227968 (filed on Aug. 29, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
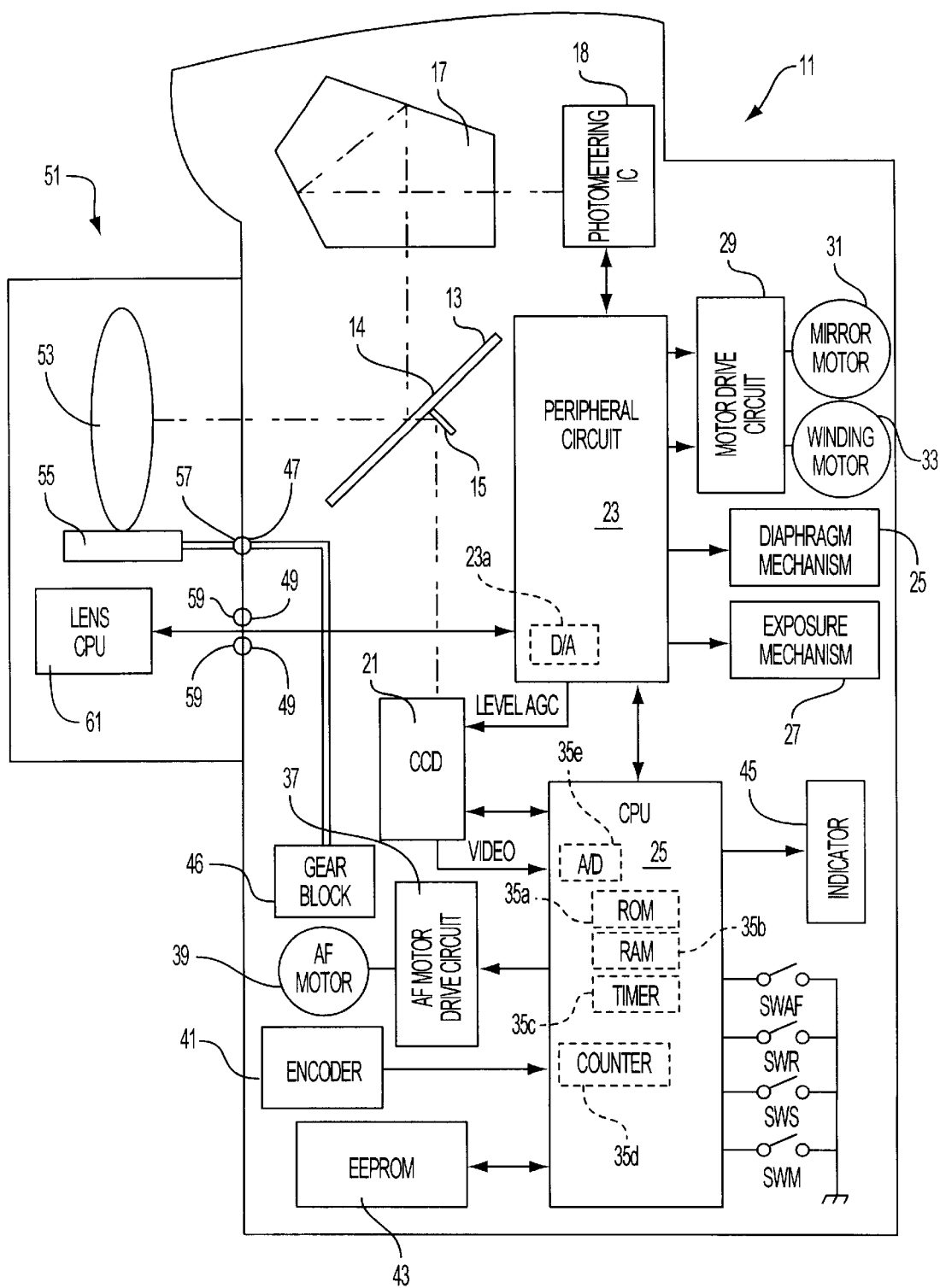
FIG. 1 is a block diagram of a single lens reflex camera having a multipoint autofocusing system according to the present invention.

FIG. 1 shows a block diagram of the main components of an automatic focusing (AF) single lens reflex camera to which the present invention is applied. The AF single lens reflex camera consists of a camera body 11 and a photographing lens 51. The photographing lens 51 is detachably attached to the camera body 11. The camera body 11 is provided with a multipoint autofocusing system (multipoint focus detecting system) and an automatic focus adjusting system.

A large part of object light entering the camera body 11 through the photographing lens 51 is reflected by a main mirror 13 toward a pentagonal prism 17 which constitutes a finder optical system. The object light is thereafter reflected by the pentagonal prism 17 and is emitted from an eyepiece (not shown). A part of the light reflected by the main mirror 13 is made incident upon a light receiving element of a photometering IC 18. The object light incident upon a half mirror portion 14 of the main mirror 13 is partly transmitted therethrough and is reflected downward by an auxiliary mirror 15 toward a multifocus detection sensor unit 21.

The object light is converted into an electrical signal which is subject to a logarithmic compression in the photometering IC 18 and is supplied to a main CPU 35 as a photometering signal through a peripheral control circuit 23.

The main CPU 35 carries out a predetermined exposure operation in accordance with the photometering signal and film sensitivity data to determine an appropriate shutter speed and diaphragm value for the exposure. The photographing operation is carried out in accordance with the shutter speed and the diaphragm value thus obtained. Namely, an exposure mechanism (shutter mechanism) 27 and a diaphragm mechanism 25 are driven to expose the film. During the photographing operation, the peripheral control circuit 23 drives a mirror motor 31 through a motor drive circuit 29 to move the main mirror 13 upward or downward. Upon completion of the photographing operation, the peripheral control circuit 23 drives a film winding motor 33 to wind the film by one frame.

Figure 2:
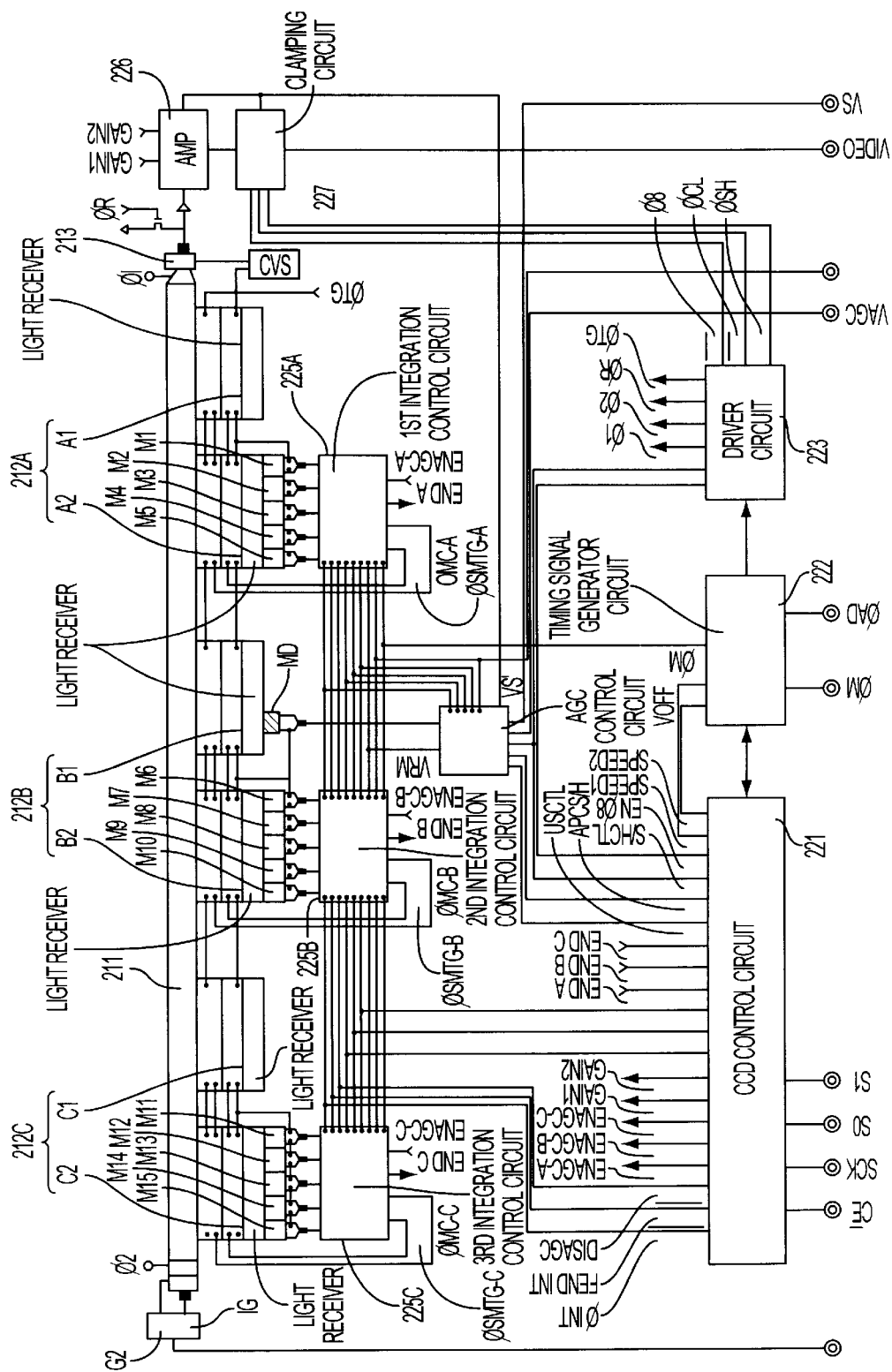
FIG. 2 is a schematic view of multifocus detection sensors of the single lens reflex camera shown in FIG. 1.

The multifocus detection sensor unit 21 is in the form of a phase difference type of distance metering sensor and consists of an optical beam splitting/reforming system and sensors (FIG. 2). The optical beam splitting/reforming system is adapted to split the object light which forms object images contained in a plurality of focus detection zones within an image plane into two light components and reforms the object images. The sensors 212A through 212C receive the split object images and integrate the same, i.e., convert the optical signal into an electric signal and accumulate the electric charges.

The main CPU 35 calculates the amount of defocus in accordance with integral data corresponding to each detection zone, which is supplied from the multifocus detection sensor unit 21. The defocus amount to be used and the priority thereof are set in accordance with the amounts of defocus to thereby calculate the direction of rotation and the number of revolutions of an AF motor 39 (i.e., the number of pulses to be output from an encoder 41). The main CPU 35 drives the AF motor 39 through an AF motor drive circuit 37 in accordance with the direction of rotation and the number of revolutions. The main CPU 35 detects and counts the pulses output from the encoder 41 in association with the rotation of the AF motor 39. When the counted number reaches the number of pulses mentioned above, the AF motor 39 is stopped.

The main CPU 35 can DC-drive the AF motor 39 at a constant speed using PWM control, in accordance with the distance between the pulses output from the encoder 41. The AF motor 39 transmits its rotation to the photographing lens 51 through a connection between a joint 47 provided on a mount of the camera body 11 and a joint 57 provided on a mount of the photographing lens 51. Consequently, a focus adjusting lens 53 is moved by a lens drive mechanism 55.

The main CPU 35 is provided therein with a ROM 35$a$ in which programs, etc., are stored, a RAM 35$b$ in which data for the calculating operation and control operation is temporarily stored, a counting reference timer 35$c$ and a hard counter 35$d$. An EEPROM 43 serving as an external memory is connected to the main CPU 35. The EEPROM 43 stores therein various inherent constants of the camera body 11 and predetermined values necessary for the integral control in the present invention.

To the main CPU 35 are connected a photometering switch SWS which is turned ON when a release button (not shown) is depressed by a half step, a release switch SWR which is turned ON when the release button is fully depressed, an automatic focusing switch SWAF which is actuated to switch an automatic focus control and a manual focus control, and a main switch SWM which is adapted to control the power supply to the main CPU 35 and/or peripheral devices, etc. The main CPU 35 indicates the set AF mode, exposure mode, photographing mode, shutter speed, or diaphragm value, etc., in an indicator 45. In general, the indicator 45 includes two indicators provided on the outer surface of the camera body 11 and within the field of view of the finder.

The main CPU 35 functions as a control means which generally controls the camera body and the photographing lens. The main CPU 35 constitutes an integration control means together with the multifocus detection sensor unit 21 and the peripheral control circuit 23, etc., and constitutes a lens drive means together with the AF motor 39, etc.

The photographing lens 51 is provided therein with the focus adjusting mechanism 55 the lens joint 57 and a lens CPU 61. The focus adjusting mechanism 55 moves the focus adjusting lens 53 in the optical axis direction. The lens joint 57 can be connected to the camera joint 47 of the camera body 11 to transmit the rotation of the AF motor 39 to the focus adjusting mechanism 55.

The lens CPU 61 is connected to the peripheral control circuit 23 of the camera body 11 through groups of electric contacts 59 and 49 to perform data communication with the main CPU 35. Data supplied from the lens CPU 61 to the peripheral control circuit 23 includes the controllable open diaphragm value Av (apex value in terms of the open f-number), the maximum diaphragm value Av (apex value in terms of the minimum f-number), lens position data, and K-value data, etc. The K-value data refers to pulse data representing the number of pulses (number of revolutions of the AF motor 39) output from the encoder 41 during the movement of the image plane on which the object images are formed by the photographing lens 51 by a unit displacement (e.g., 1 mm) in the optical axis direction by the AF motor 39.

In the single lens reflex camera, the AF operation begins when the photometering switch SWS is turned ON. In the AF operation, the multifocus detection sensor unit 21 commences the integral operation. Upon completion of the integral operation, the main CPU 35 calculates the defocus amount and the number of drive pulses in accordance with the integral values input thereto. Consequently, the AF motor 39 is driven in accordance with the number of drive pulses output from the encoder 41.

FIG. 2 shows in detail the circuitry of the multifocus detection sensor unit 21 which detects the focus state (defocus amount) of the object images of the plurality of focus detection zones. The object light incident upon the photographing lens 51, transmitted through the central half mirror portion 14 of the main mirror 13, and reflected by the auxiliary mirror 15 is made incident upon the multifocus detection sensor unit 21. The object light incident upon the multifocus detection sensor unit 21 is converged onto a secondary image forming surface conjugate with a film surface or in the vicinity thereof and passes through three openings formed on a mask provided on the secondary image forming surface. Thus, the rays of the object image are converged onto the respective light receiving device (FIG. 2). Note that the three openings define the focus detection areas (zones). The light in each focus detection area is split into two by a beam splitter and is converged onto respective light receivers provided on the image reforming surface.

The multifocus detection sensor unit 21 consists of a CCD transfer portion 211, and the three spaced sensors 212A, 212B and 212C each of which serves as a light receiving device. The sensors 212A, 212B and 212C are arranged close to the CCD transfer portion 211 and along the longitudinal direction thereof. The sensors 212A, 212B and 212C are each provided with a pair of light receivers A1, A2; B1, B2; C1, C2. As is well known, the light receivers A1, A2; B1, B2; and C1, C2 are each made of a photodiode (pixel) array having photodiodes that are spaced at a predetermined distance along a line.

The sensors 212A, 212B and 212C are provided with storage portions in which electric charges produced by the photodiodes of the light receivers A1, A2, B1, B2, C1 and C2 are integrated (accumulated) for each photo diode, and memory portions in which the electric charges accumulated in the storage portions are temporarily stored when the integral is completed. Namely, the electric charges produced by the photodiodes which have received the object light are stored in the storage portions, and the electric charges integrated in the storage portions are transferred to and held in the memory portions upon completion of the integral operation. When the integral operations of all of the sensors 212A, 212B and 212C are complete, the electric charges held in the memory portions are transferred to the CCD transfer portion 211 at one time. The CCD transfer portion 211 is provided with a number of spaced electrodes (not shown), so that the electric charges are transferred stepwise for each pixel, in response to the two-phase transfer clocks $\phi 1$, $\phi 2$ applied to the electrodes. Thereafter, the transferred electric charges are converted into voltage signals by an output converter 213 (reading portion) of the CCD transfer portion 211 and are output therefrom.

The voltage signal output from the output converter 213 is amplified by an amplifier 226 and is output as a video signal VIDEO which is produced in connection with a reference level, from a clamping circuit 227. The video signal VIDEO output from the clamping circuit 227 is supplied to the CPU 35 where the video signal is converted into a digital signal by an A/D converter 35e and is stored in the RAM 35b for each pixel. The stored digital signals can be used for the calculation of the defocus amount.

Monitor sensors M1 through M5, M6 through M10, and M11 through M15, are provided adjacent to the sensors 212A, 212B and 212C to monitor the integral values (quantity of received light) of the sensors. A monitor dark sensor MD is provided close to the first light receiver B1 of the second sensor 212B. The monitor sensors M1 through M15 are adapted to detect the integral value in order to control the integration time (completion of the integral operation) in accordance with the brightness of the object. The monitor dark sensor MD which is optically isolated is adapted to obtain a signal to remove the dark current component of the monitor sensors M1 through M15.

The integral operation (accumulation of the electric charges) of the three sensors 212A, 212B and 212C, the transfer of the electric charges (integral values) from the sensors 212A, 212B and 212C to the CCD transfer portion 211, the transfer of the electric charges in the CCD transfer portion 211, the conversion of the electric charges to the voltage signals in the output converter 213, the clamping operation of the clamping circuit 227, etc., are driven in accordance with the clock signals (pulse signals) output from the CCD control circuit 221, a timing signal generator circuit 222, and a driver circuit 223.

The output of the dark sensor MD is used to correct the integral completion level of an AGC control circuit 224, and the outputs of the monitor sensors M1 through M5, the monitor sensors M6 through M10, and the monitor sensors M11 through M15 are used to control the integral operations of first, second and third integral control circuits 225A, 225B and 225C, respectively.

Figure 3:
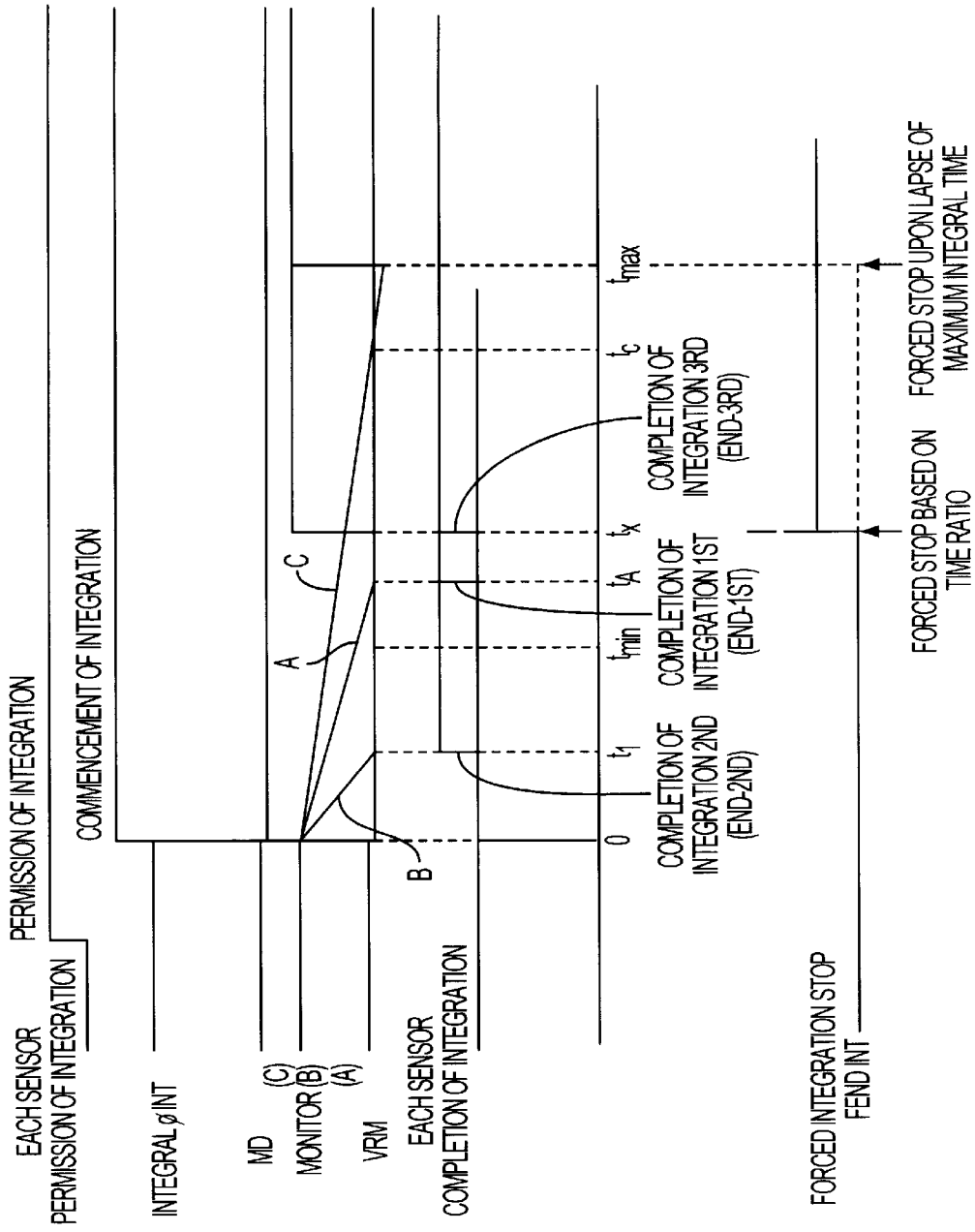
FIG. 3 is a timing chart of integral operations of the multifocus detection sensors shown in FIG. 1.

FIG. 3 shows a timing chart of the integral operation. The integral control operation in the single lens reflex camera begins when the photometering switch SWS is turned ON. When the photometering switch SWS is turned ON, the CCD control circuit 221 produces the integral commencement signal $\phi$INT to start the integral operation in response to communication data supplied from the CPU 35. When the integral control circuits 225A through 225C detect that the integral values of the monitor sensors M1 through M15 which are monitored by the integral control circuits 225A through 225C, reach a predetermined integral completion level VRM, the integral completion signals END-A through END-C are output. Consequently, the sensors 212A through 212C stop the integral operation. If no integral operation of the sensor 212A, 212B or 212C is complete after the lapse of a predetermined integration time tx or the lapse of the maximum integration time $t_{max}$, the integral operation of the sensor is forcedly stopped. The forced stop of the integral operation is carried out in accordance with the integral forced stop signal FENDint output from the CCD control circuit 221 to the integral control circuits 225A through 225C and the integral completion signal output from the integral control circuits 225A through 225C.

The CPU 35 detects the integration time of the integral control circuits 225A through 225C using the integral completion signals output from the integral control circuits 225A through 225C.

Upon completion of the integral operation of all of the sensors 212A, 212B and 212C, a transfer pulse $\phi$TG is output from the driver circuit 223, so that the electric charges (signals) integrated by the sensors 212A, 212B and 212C are transferred to the CCD transfer portion 211. The signals transferred to the CCD transfer portion 211 are transferred to the CCD transfer portion 211 for each pixel, in accordance with the transfer/read clocks $\phi 1$, $\phi 2$ which are generated in synchronization with the reference clock $\phi M$. The signal charges are successively converted into voltage signals for each pixel at the output converter 213 and are output (read) therefrom. The voltage signals are amplified by the amplifier 226, are clamped by the clamping circuit 227, and are output as the video signal VIDEO for each pixel. The clamping circuit 227 sample-holds the output in synchronization with the hold pulse $\phi$SH and outputs the same as the video signal VIDEO.

The main operations of the multipoint autofocusing system will be discussed below with reference to FIGS. 4 through 7.

Figure 4:
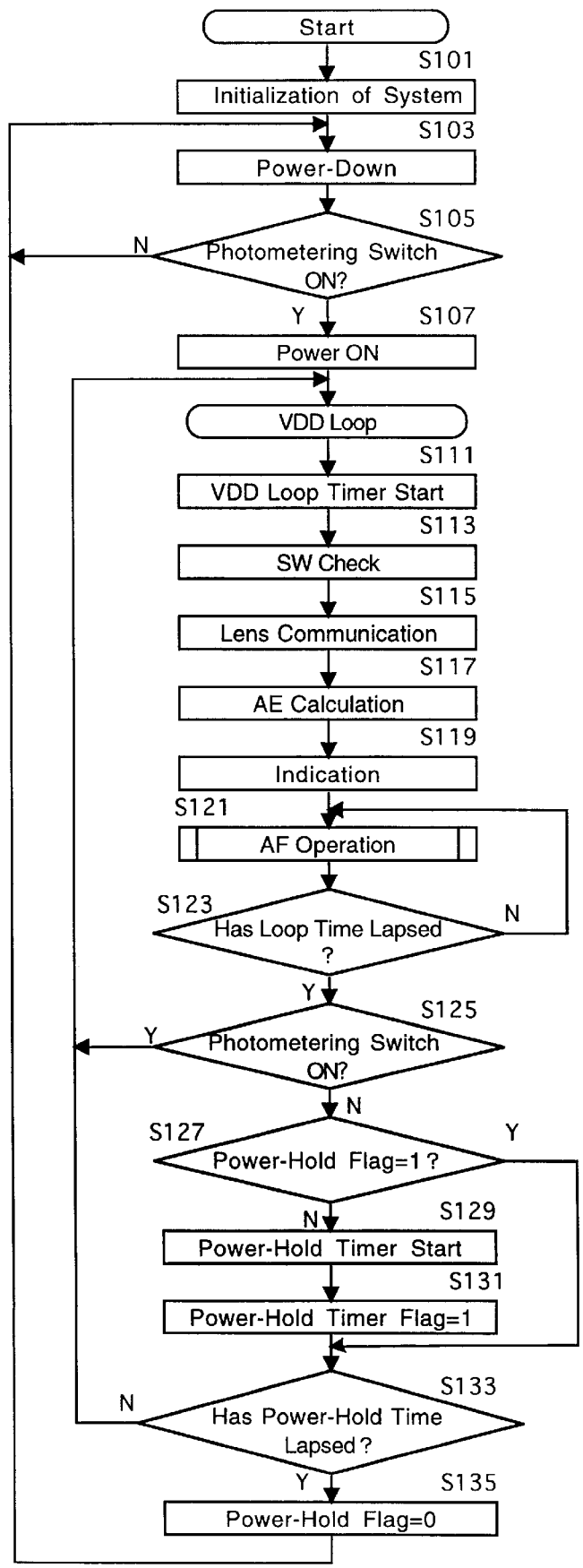
FIG. 4 is a main flow chart showing the main operations in the single lens reflex camera shown in FIG. 1.

FIG. 4 shows a flow chart of the main operation of the single lens reflex camera. In the main operation, when the photometering switch SWS is turned ON, the photometering operation and the exposure calculation (AE operation) are carried out to obtain an optimal diaphragm value and shutter speed. Thereafter, the focus detection and lens movement are carried out to realize an in-focus state. When the release switch SWR is turned ON, the exposure operation is performed at the diaphragm value and the shutter speed obtained by the AE operation.

When a battery is loaded, the control enters the main routine. In the main routine, the RAM 35b is initialized (step S101). No power is supplied to elements or circuits other than the CPU 35 before the photometering switch SWS is turned ON (steps S103, S105). If the photometering switch SWS is turned ON, the electrical power is supplied to the peripheral devices or circuits (step S107) to perform the operation of the VDD loop.

In the VDD loop operation, the VDD loop timer starts at step S111, and the state of the switches is checked (step S113). Thereafter, the lens communication with the lens CPU 61 is carried out to input the lens data such as the open diaphragm value, the minimum diaphragm, or the focal distance data, etc. (S115).

Thereafter, the AE calculation is carried out (S117), and the photographing data, such as the shutter speed obtained by the calculation is indicated (S119). The AE calculation refers to an operation in which the brightness of the object is measured by the photometering IC 18 and the most appropriate shutter speed and diaphragm value at a predetermined exposure mode, for example, at a program exposure mode, in accordance with the brightness data or the film sensitivity data, etc., are calculated.

When the shutter speed and the diaphragm value are determined, the AF operation is carried out (step S121) in which the focusing lens 53 is moved to focus on the object. The AF operation is repeated during the loop operation time (step S123).

After the lapse of the loop operation time, the state of the photometering switch SWS is checked. If the photometering switch SWS is turned ON, the control is returned to the VDD loop operation (S125, S111).

If the photometering switch SWS is turned OFF, whether or not a power hold flag is set is checked. If no power hold flag is set, the power hold timer starts, and the power hold flag is set. The VDD loop operations are repeated until the set time of the power hold timer is up (S125, S127, S129, S131, S133, S111). If the power hold flag is determined to be set at step S127, the VDD loop operations are repeated until the set time of the power hold timer is up. After the lapse of the power hold time, the power hold flag is cleared and the control is returned to the power down operation (S133, S135, S103).

<AF Operation>

Figure 5:
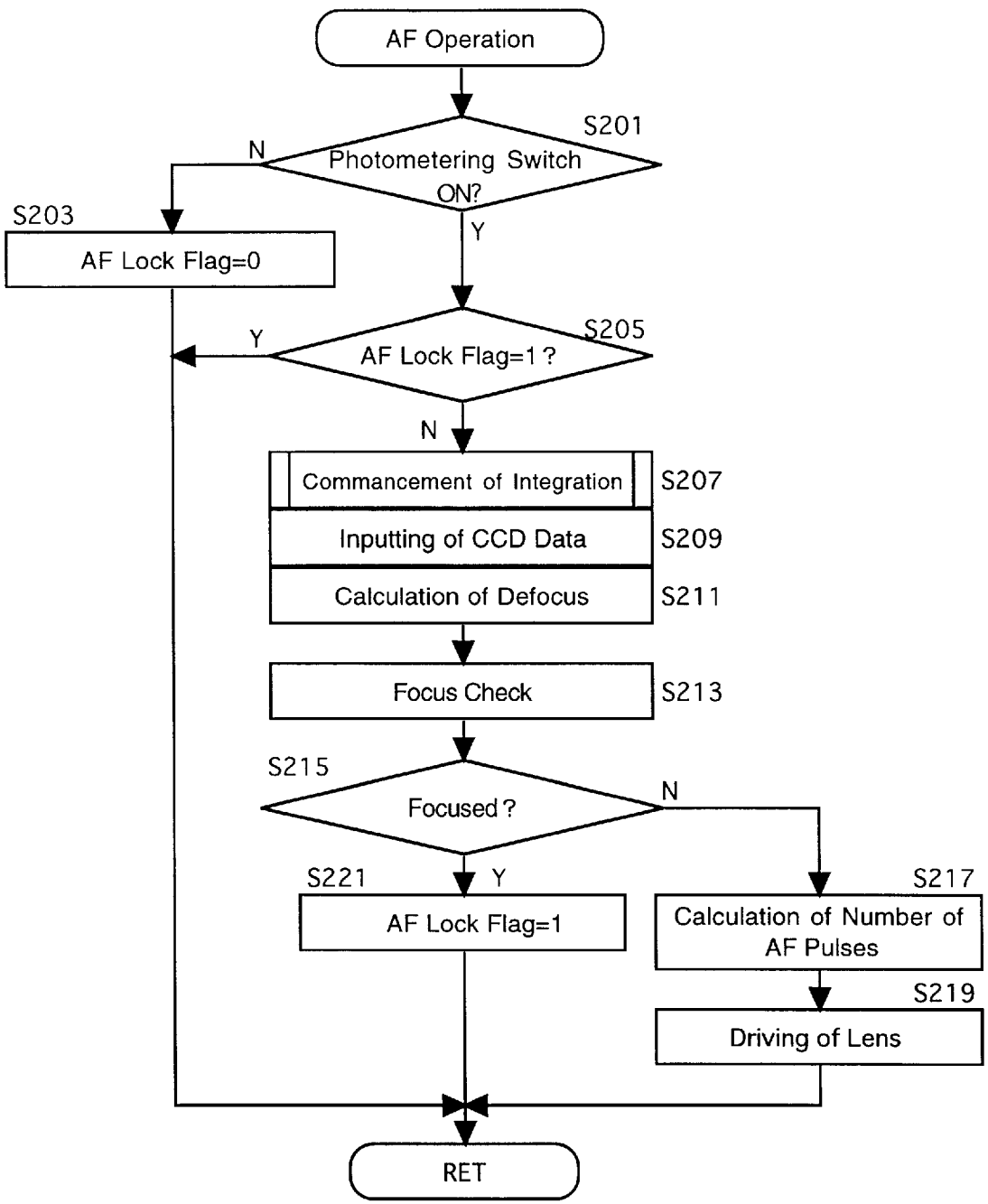
FIG. 5 is a flow chart showing an AF operation in the single lens reflex camera shown in FIG. 1.

The AF operation which is called at step S121 will be described below in more detail with reference to FIG. 5. In the AF operation, whether or not the photometering switch SWS is turned ON is checked (S201). If the photometering switch SWS is OFF, the AF lock flag is cleared and the control is returned (S201, S203). The AF lock flag is set once the focused state is obtained. The AF lock flag corresponds to a focus-lock mode in which the focused state for the object is held when the lens is focused on the object.

If the photometering switch SWS is determined to be turned ON at step S201, whether or not the AF lock flag is set is checked (S205). If the AF lock flag is set, the control is returned. If no focused state is obtained, i.e., if no AF lock flag is set, the integral operations of the sensors 212A, 212B and 212C are commenced (S205, S207). When the integral operation is finished, the CCD video data is input (S209) and the defocus amount for the selected detection zone is calculated (S211). Whether or not the lens is focused is checked in accordance with the defocus amount. In case of an out-of-focus state, the number of AF pulses is calculated based on the defocus amount and the K value data, so that the AF motor 39 is driven in accordance with the number of AF pulses (S213, S215, S217, S219). Control is then returned. If the lens is focused, the AF lock flag is set and the control is returned (S215, S221).

<Commencement of Integral Operation>

Figure 6:
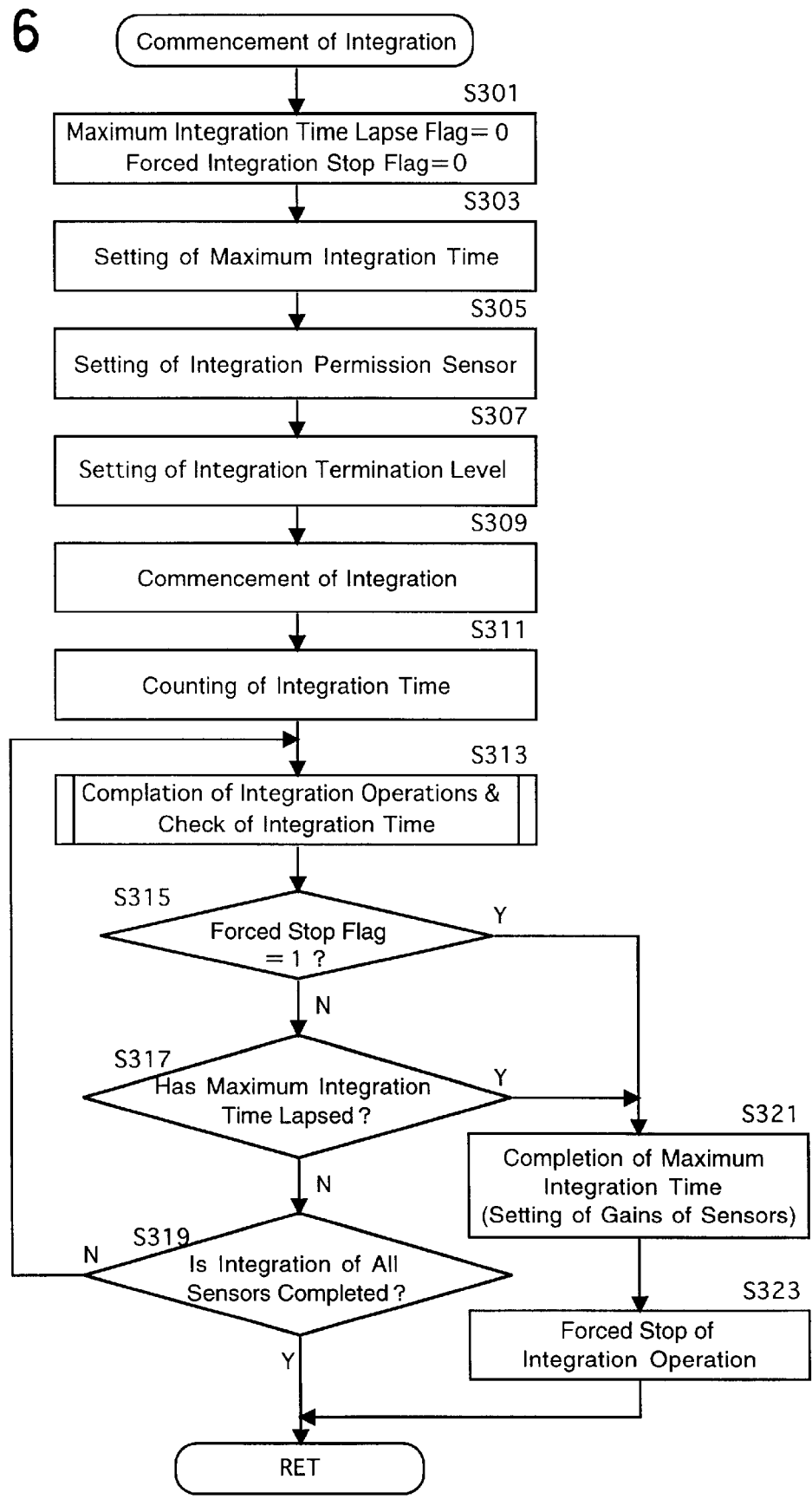
FIG. 6 is a flow chart showing an integral commencement operation in the single lens reflex camera shown in FIG. 1.

The commencement of the integral operation at step S207 will be discussed below with reference to FIG. 6. In the integral operation, the multifocus detection sensor unit 21 commences the integral operation and stops the integral operation when appropriate integral values are obtained.

The maximum integration time expiration flag and the forced integral stop flag are cleared (S301). The maximum integration time expiration flag represents that the integral value does not reach the integral completion level VRM (no integral operation is complete) when the maximum integration time $t_{max}$ has lapsed. The forced integral stop flag represents that the integral value does not reach the integral completion level VRM but nevertheless, the integral operation is forcedly stopped. In the illustrated embodiment, all the sensors 212A, 212B and 212C are used.

The maximum integration time $t_{max}$ is set, the integral permission flags 212A through 212C are set, and the AGC (integral completion) level is set (S303, S305, S307). Thereafter, the integral operation starts and the integration time is counted (S309, S311).

The following operations are repeated until the integral operation of the permitted sensors 212A through 212C is completed or the maximum integration time $t_{max}$ lapses (S313 through S323). Namely, the integral completion and the integration time of the sensors 212A through 212C which are permitted to carry out the integral operation are checked (S313). Thereafter, a determination is made as to whether or not the forced integral stop flag is set (S315). If no forced integral stop flag is set, a determination is made as to whether or not the maximum integration time $t_{max}$ has lapsed (S317). If no maximum integration time has lapsed, a determination is made as to whether or not the integral operations of all the sensors 212A through 212C are completed (S319). If the integral operation of any one of the sensors 212A through 212C is not complete, the control is returned to step S313.

If the integral operations of all the sensors 212A through 212C are completed, the control is returned (S319). If the forced integral stop flag is set or the maximum integration time $t_{max}$ has lapsed, the integral operation of any of the sensors 212A, 212B and 212C of which the integral operation has not yet been completed is forcedly stopped (S323) and the control is returned.

Figure 7:
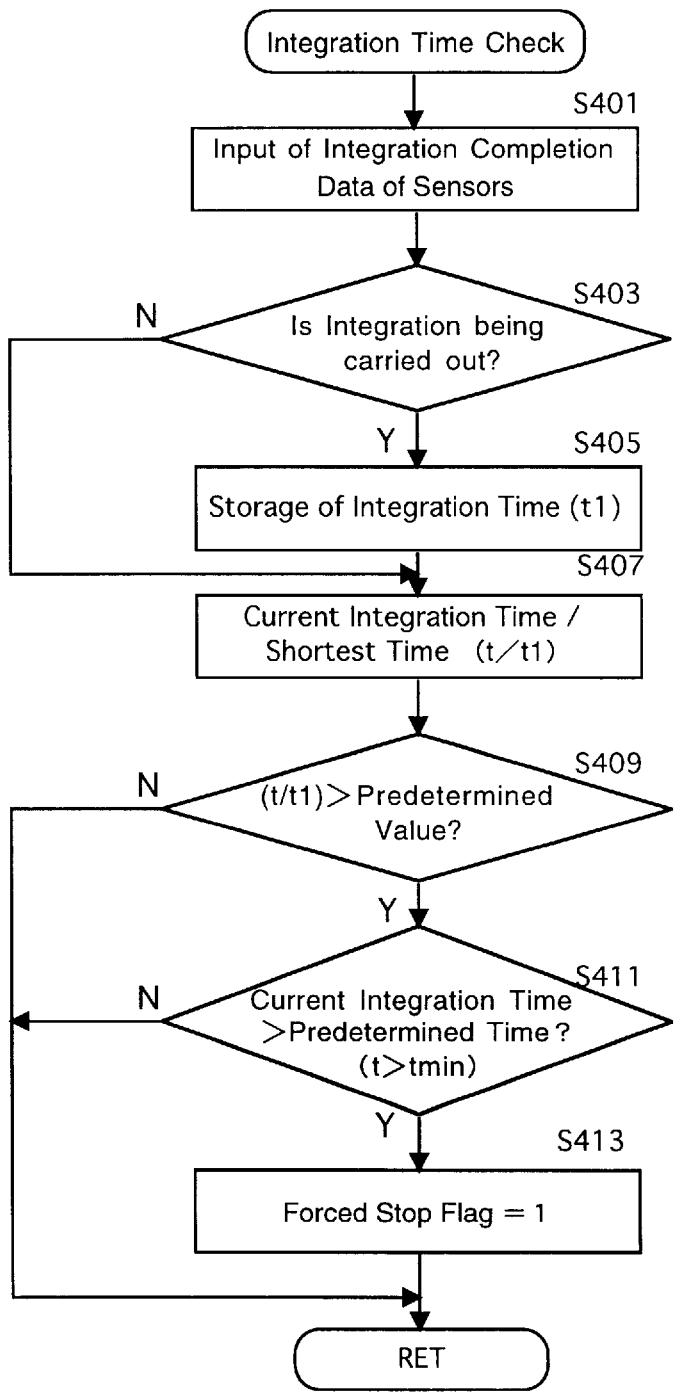
FIG. 7 is a flow chart showing an integration time check operation in the single lens reflex camera shown in FIG. 1.

The integration time check operation which is called at step S313 will be discussed below with reference to FIG. 7. The integration time check operations are repeated until the integral operations of all of the sensors 212A through 212C are completed. The integration time is measured by the timer 35c. Based on the integration time (shortest integration time t1) of the sensor 212A, 212B or 212C which has first completed the integral operation, the forced integral stop time tx at which the integral operation of the remaining sensors 212A, 212B or 212C is forcedly stopped is determined.

In the integration time check operation, the integral completion data of the sensors 212A through 212C which are permitted to perform the integral operation is input (S401). Whether or not all the sensors 212A through 212C are conducting the integral operation is checked. If the integral operations of all the sensors are being carried out, the current integration time is stored in the memory (if already stored, the stored value is replaced by the current integration time). If the integral operation of any of the sensors 212A through 212C is completed, the integration time storage operation is skipped (S403, S405). Due to the skip, the integration time stored at step S405 is held as the shortest integration time (first integral completion time). The stored integration time corresponds to the shortest time t1.

The current integration time t is divided by the shortest integration time t1 to obtain the integration time ratio (t/t1) at step S407. The control is returned and the operations mentioned above are repeated until the integration time ratio is above a predetermined value, i.e., until the ratio equals a predetermined time the integration time of the first sensor 212A, 212B or 212C lapses from the completion of the first sensor (S409). Consequently, if the integral value of another sensor 212A, 212B or 212C reaches a predetermined integral level before the integration time ratio is above a predetermined value, the integral operation is stopped. If the integral values of all the sensors 212A through 212C reach the predetermined integral level, the integral operations are stopped and the control is returned to the AF operation from step S319.

If the integration time ratio reaches a predetermined value before the integral values of all the sensors 212A through 212C reach the predetermined integral level, a determination is made as to whether or not the current integration time t is larger than the predetermined value $t_{min}$ (S411). The control is returned to the integral operation until the current integration time t reaches the predetermined value $t_{min}$. Namely, the integral operation continues for the predetermined time $t_{min}$ whatever the value of the shortest integration time t1 is.

For instance, if the light of a high brightness object, such as a lamp or other light source or reflected sun light is incident upon the sensor 212A, 212B or 212C, the integral operation of that sensor is completed within an extremely short space of time. However, such an extremely short time would be insufficient to complete the integral operation for an object of average brightness. If the current integration time t is longer than the predetermined time $t_{min}$, the forced integral stop flag is set and the control is returned to the integral commencement operation (S411, S413).

If the forced integral stop flag is set and the control is returned to the integral commencement operation, the integral operation of the sensor(s) 212A, 212B and/or 212C which has (have) not completed the integral operation, even after the lapse of the maximum integration time, is forcedly stopped and the control is returned to the AF operation (S315, S321, S323). If the control is returned to the integral commencement operation without setting the forced stop flag and consequently, the maximum integration time $t_{max}$ lapses, the integral operation of the sensor that has not completed the integral operation after the lapse of the maximum integration time is forcedly stopped and the control is returned to the AF operation (S315, S317, S321, S323).

In a preferred embodiment, the maximum integration time $t_{max}$ and the predetermined time $t_{min}$ are 300 ms and 100 ms, respectively. However, $t_{max}$ and $t_{min}$ are not limited thereto.

In the illustrated embodiment, although the forced integral completion time tx is obtained by the formula represented by (current integration time t)/(shortest time t1)>(predetermined value), it is also possible to use a formula defined by (forced integral completion time tx)=(predetermined time)×(shortest time t1), so that the forced integral completion time tx can be obtained by comparing with the current integration time t.

As can be understood from the above discussion, according to the present invention, there are a plurality of light receiving devices. Assuming that the integration time of the light receiving device which has first reached a predetermined integral value is t1 and the integration time of the remaining light receiving devices that have not reached the predetermined integral value is t, the integral operation of all the light receiving devices that have not completed the integral is forcedly stopped when the ratio of t/t1 is above a predetermined value. Thus, the integral operation is stopped before the integral operation of any light receiving device is completed. Consequently, if a light receiving device receives light of a high brightness object, the integral operation is stopped earlier than usual even if other light receiving devices have not completed the integral operation, and hence the time necessary for the focus adjustment can be reduced.

What is claimed is:

1. A multipoint autofocusing system having a plurality of light receiving devices each having a plurality of focus detection areas which receive light of object images and perform an integral operation in which said object light is converted to produce integrated electric charges, the multipoint autofocusing system comprising:

detecting means for detecting an integration time of each of said light receiving devices based upon commencement of said integral operation; and, integration control means for controlling said integration times to stop said integral operation of one of said light receiving devices when said integration time of said light receiving device reaches a predetermined integral value;

wherein said integration time of said light receiving device that first reaches said predetermined integral value is represented by t1, and said integration time of said remaining light receiving devices that have not reached said predetermined integral value is represented by t, and said integration control system controls said termination of said integral operation of said remaining light receiving devices in accordance with a ratio of t/t1.

2. A multipoint autofocusing system according to claim 1, wherein said integration control means forcedly terminates said integral operation of all of said light receiving devices that have not completed said integral operation when said ratio of t/t1 is above a predetermined value.

3. A multipoint autofocusing system according to claim 2, wherein said integration control means forcedly terminates said integral operation of all of said light receiving devices having integral times below said predetermined integral value.

4. A multipoint autofocusing system according to claim 3, wherein if said ratio t/t1 is above said predetermined value before said integration time t reaches a predetermined time $t_{min}$ which is shorter than a maximum integration time $t_{max}$, said integration control means does not forcedly terminate said integral operation of said light receiving devices before said predetermined time $t_{min}$ lapses.

5. A multipoint autofocusing system according to claim 4, wherein said integration control means forcedly terminates said integral operation of all of said light receiving devices that have not completed said integral operation when said predetermined integration time t is equal to or longer than said maximum integration time $t_{max}$, even if said ratio of t/t1 is smaller than said predetermined integral value.

6. A multipoint autofocusing system according to claim 5, further comprising first monitor means which are provided for and adjacent to each of said light receiving devices for monitoring the quantity of light received.

7. A multipoint autofocusing system according to claim 6, incorporated into a single lens reflex camera, wherein said object images in said plurality of focus detection areas are formed by said object light being transmitted through a photographing lens of said single lens reflex camera.

8. A multipoint autofocusing system according to claim 7, further comprising three pairs of light receiving devices and second monitor means, wherein said object image is split into two images by a beam splitting/image reforming means, so that said split images are formed in each of said pairs of light receiving devices and said second monitor means monitors one of said split object images.

9. A multipoint autofocusing system having a plurality of light receiving devices each having a plurality of focus detection areas which receive light of object images and perform an integral operation in which said object light is converted to produce integrated electric charges, and first monitor means for monitoring integral values of each of said light receiving devices, the multipoint autofocusing system comprising:

detecting means for detecting an integration time of each of said light receiving devices based upon a commencement of said integral operation; and, integration control means for controlling said integration times to stop said integral operation of one of said light receiving devices when said integration time of said one of said light receiving devices reaches a predetermined integral value, and for forcedly terminating said integral operation of all of said light receiving devices having integration times which have not reached said predetermined integral value after a maximum integration time $t_{max}$ has lapsed;

wherein said integration control means determines a forced integral stop time using a formula defined by:

t1×(predetermined integral value)

wherein t1 represents a shortest integration time of said light receiving device which first reaches said predetermined integral value, said integration control means forcedly terminates said integral operation of all of said light receiving devices having integration times below said predetermined integral value after said lapse of said maximum integration time $t_{max}$.

10. A multipoint autofocusing system according to claim 9, wherein said integration control means forcedly terminates said integral operation of all of said light receiving devices having integration times below said predetermined integral value after said lapse of said maximum integration time $t_{max}$ when said forced integral stop time is longer than said maximum integration time $t_{max}$.

11. A multipoint autofocusing system according to claim 10, wherein said integration control means forcedly stops said integral operation of all of said light receiving devices having integration times below said predetermined integral value after a lapse of a predetermined time $t_{min}$ without stopping said integral operation of said light receiving devices having integration times below said predetermined integration time upon a lapse of said forced integral stop time if said forced integral stop time is shorter than said predetermined time $t_{min}$ which is shorter than said maximum integration time $t_{max}$.

* * * * *

UNITED STATES PATENT AND TRADEMARK OFFICE
CERTIFICATE OF CORRECTION

PATENT NO. : 5,845,155
DATED : December 1, 1998
INVENTOR(S) : M. Nakata et al.

It is certified that error appears in the above-identified patent and that said Letters Patent is hereby corrected as shown below:

At column 10, line 59 (claim 4, line 2) of the printed patent, after "predetermined" insert --integral--.

Signed and Sealed this

Ninth Day of May, 2000

Attest:

Q. TODD DICKINSON

Attesting Officer

Director of Patents and Trademarks